United States Patent
Weaver

[15] 3,698,249
[45] Oct. 17, 1972

[54] FLUID PRESSURE MONITORING SYSTEM

[72] Inventor: Preston R. Weaver, Rocky Hill, Conn.

[73] Assignee: UMC Electronics Company, North Haven, Conn.

[22] Filed: Aug. 3, 1970

[21] Appl. No.: 60,429

[52] U.S. Cl. .............................. 73/398 R, 73/119 A
[51] Int. Cl. ................................................ G01l 9/08
[58] Field of Search ..................... 73/119 A, 118, 398

[56] References Cited

UNITED STATES PATENTS

| | | |
|---|---|---|
| 3,149,492 | 9/1964 | Weinberg ..................... 73/393 |
| 3,327,526 | 6/1967 | North ...................... 73/119 A |
| 3,535,937 | 10/1970 | Wiggins et al. ......... 73/398 AR |

*Primary Examiner*—Donald O. Woodiel
*Attorney*—Delio and Montgomery

[57] ABSTRACT

This disclosure relates to a transducing apparatus adapted to sense fluid pressure in a line by sensing expansion of the line. A transducer mounting member which is generally H-shaped defines a line receiving passage through one pair of legs and supports a transducing element between the other pair of legs. Stress applied to the mounting member by the line is detected by the transducer.

39 Claims, 11 Drawing Figures

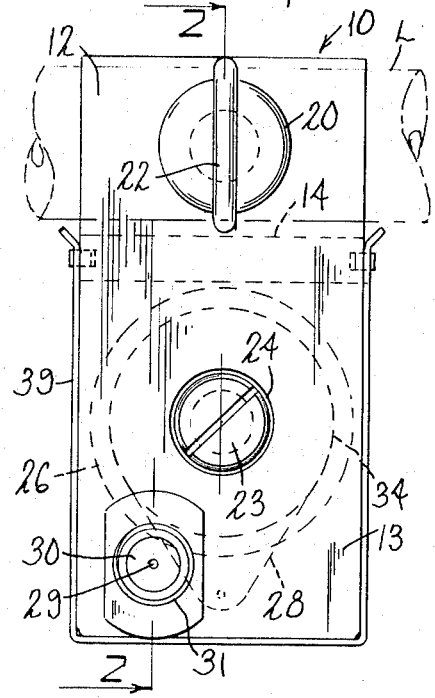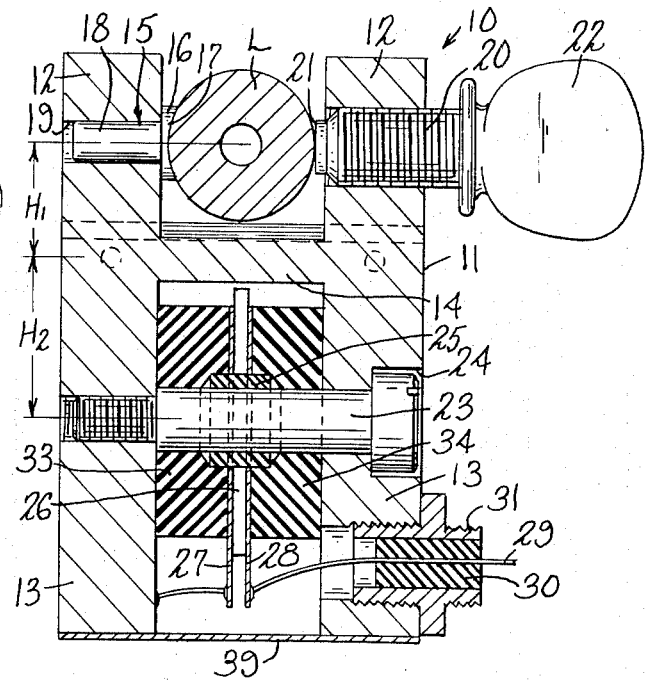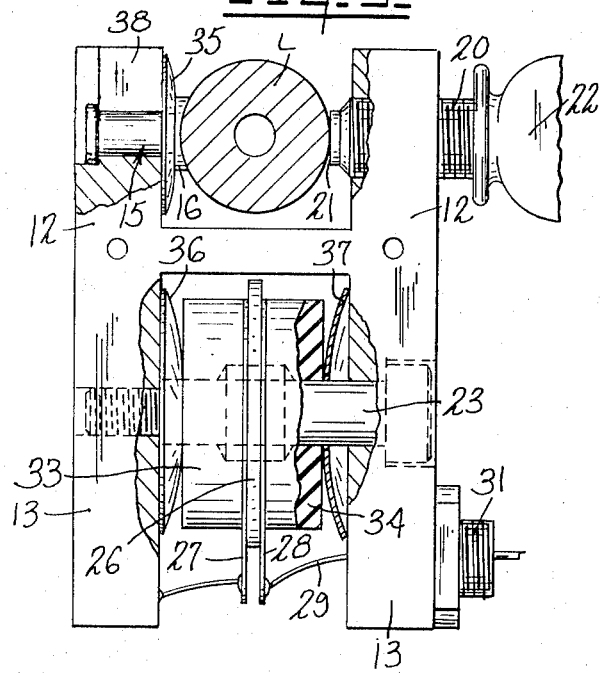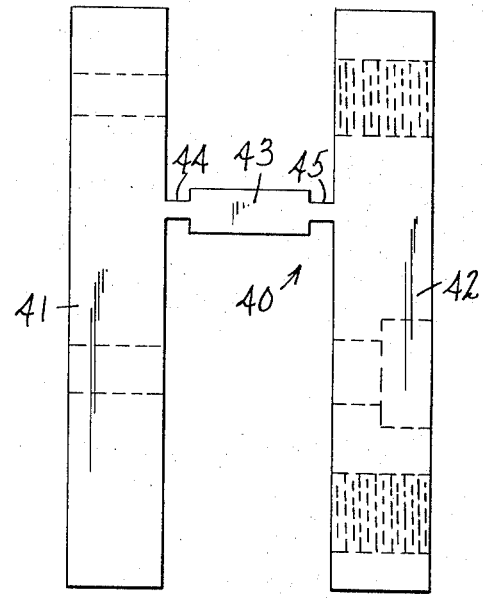
INVENTOR
Preston R. Weaver
BY Dedio and Montgomery
ATTORNEYS

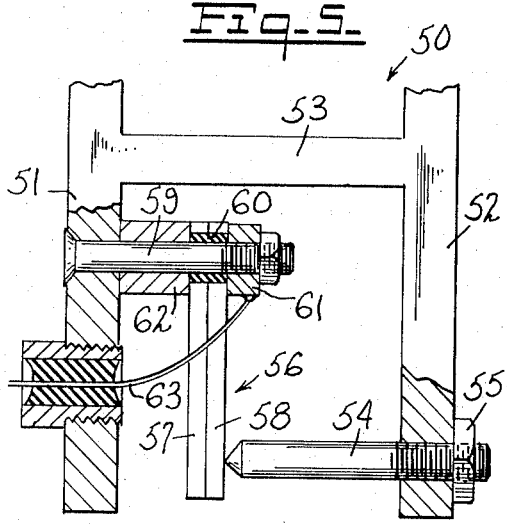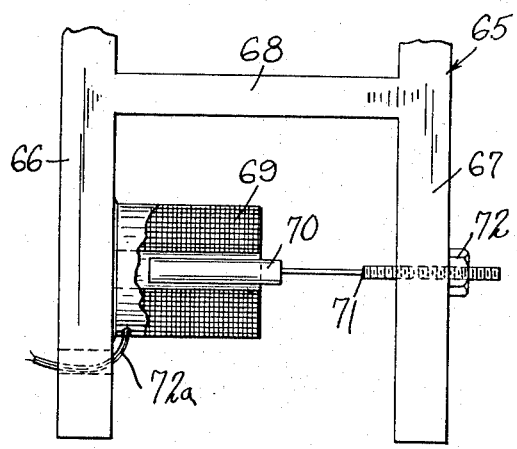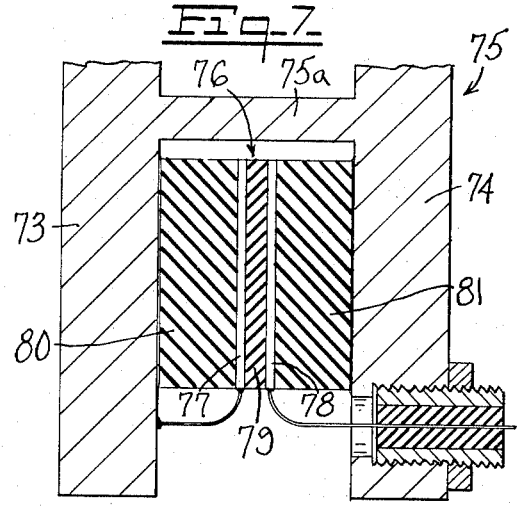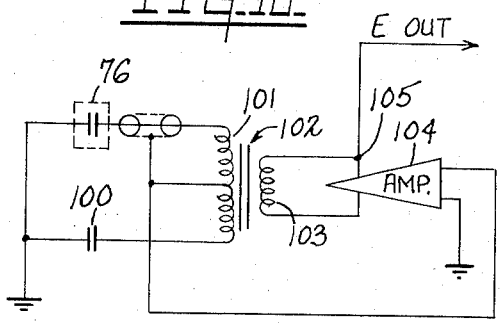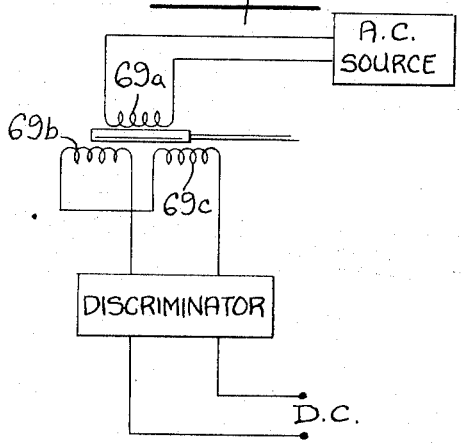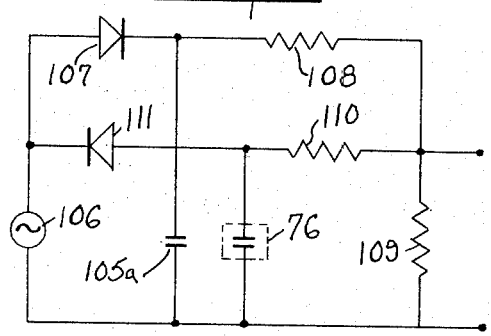
INVENTOR
Preston R. Weaver
BY De Lio and Montgomery
ATTORNEYS

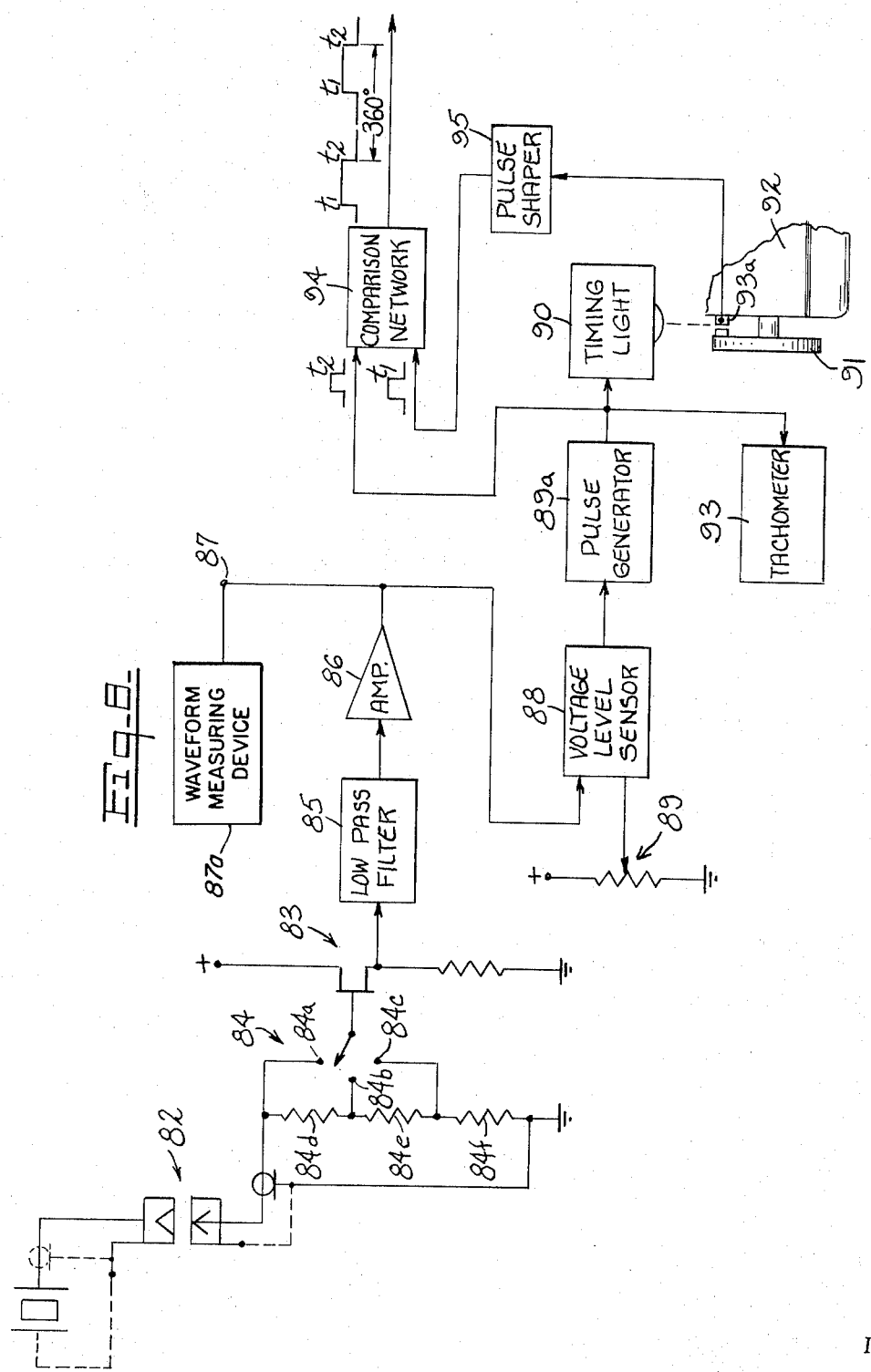

FLUID PRESSURE MONITORING SYSTEM

This invention relates to measuring devices, and more particularly relates to transducers adapted to sense fluid pressure in a tube, line or conduit.

The present invention provides new and improved transducing arrangements for measuring the fluid pressure in a line or tube by sensing expansion of the tube due to the pressure therein and generating an electrical signal which varies as function of expansion or change in dimension of the line.

Transducers embodying the present invention may be utilized for measuring the pressure or line expansion in environments where the fluid passes through the line in charges such as the injection lines of fuel injection type engines, and also environments where the flow of fluid in the line is under relatively constant pressure.

This invention provides transducing arrangements which may be rapidly applied to a line and removed therefrom without cutting into or altering the line.

The present invention further provides transducing arrangements which accept tubes of the same outside diameter but having different inside diameter and includes means for compensating for the various wall thickness. The invention may be utilized in conjunction with lines generally considered rigid as well as flexible lines and lines of reinforced flexible material.

Apparatus embodying the invention is extremely compact and easily mountable to a line, may be readily used in the field and will detect and indicate pressures with very high accuracy.

Briefly stated, the invention in one form thereof, comprises a housing or mounting member which is generally H-shaped. The line in which fluid pressure is to be measured is received in a clamping means between the upper vertical legs of the H and a pressure or movement sensitive transducer is carried between the lower vertical legs of the H. In one form, where pulsating pressure in the line is to be measured, a transducing element, such as a piezoelectric element is mounted on a supporting member carried by the lower legs of the H housing. It is subjected to compression by the lower legs by inward movement of the lower legs in response to outward movement of the upper legs due to expansion of the line in the clamping means.

The signal detected from the pressure-sensitive crystal transducer is then conditioned to obtain the desired intelligence and may be modified in accordance with various parameters of the tubing under consideration.

Where a transducer embodying the invention is to be utilized in the timing of an internal combustion engine of the fuel injection type the condition signal may be utilized to fire a strobe or timing light which illuminates the top dead center marking position of a piston of the engine.

An object of this invention is to provide a new and improved transducer for sensing fluid pressure or charge in a fluid line by detecting the expansion of the line.

Another object of this invention is to provide a new and improved transducing arrangement of the type described which may be mounted to and demounted from an existing line with rapid facility and without requiring insertion of any extraneous parts into the line or cutting into the line.

Another object of this invention is to provide a new and improved transducer for the purposes described which is simple in structure, economical in manufacture, and requires only a single unitary housing or frame member which is adaPted to accept various types of transducer elements.

A still further object of this invention is to provide a new transducing arrangement for the purposes described including signal conditioning circuitry which permits the use of the transducer on fluid lines of varying internal diameters with only minor calibration.

The features of the invention which are believed to be novel are distinctly claimed and particularly pointed out in the concluding portion of this specification. However, the invention both as to its organization and operation, together with further objects and advantages thereof, may best be appreciated by reference to the following detailed description taken in conjunction with the drawings, wherein:

FIG. 1 is a side elevation of a transducing unit embodying the invention;

FIG. 2 is a view seen in the plane of lines 2—2 of FIG. 1;

FIG. 3 is a view in front elevation and partially cut away showing an alternate form of the transducing arrangement of FIGS. 1 and 2;

FIG. 4 is a view in front elevation of a frame or mounting member which may be utilized in apparatus embodying the invention;

FIG. 5 is a partial front elevation of a transducing arrangement embodying the invention with a different form of transducer;

FIG. 6 is a partial front elevation partly cut away of another transducing arrangement embodying the invention adapted to utilize a different transducing element.

FIG. 7 is a partial front elevation in half section of another transducing arrangement using a capacitive transducer.

FIG. 8 is a diagram, partly schematic and partly in block form, exemplifying a signal conditioning network which is used with a transducing arrangement embodying the invention.

FIG. 9 is a schematic diagram of a circuit utilized in conjunction with the transducing element of FIG. 6.

FIGS. 10 and 11 are schematic diagrams of circuits used in conjunction with the transducing arrangement of FIGS. 10 and 11.

A transducer arrangement 10 embodying the invention in one form thereof as shown in FIGS. 1 and 2 comprises a housing member or frame 11 of generally H-shape having upper spaced-apart arms 12 and lower spaced-apart arms 13 and which are continuations of arms 12. A bridging or cross portion 14 joins the spaced arms. The housing member or frame 11 is formed as an integral member. The member 11 is formed with the stiffness of the arms high in relation to the bridging portion 14. Line coupling means are carried by the upper arms 12 for clamping the housing member 11 to a line or tube L. The coupling means comprises a line seating member 15 having a head portion 16 providing a surface 17 which is complementary to the surface of the line to be monitored. As shown, surface 17 is concave to seat the tubular line L therein. Member 15 further includes a shank portion 18 received in an opening provided therefor in an arm 12. Shank 18 and passage 19 may be formed other than cylindrical to seat shank 18 in a predetermined position. The coupling means further comprises a screw 20 threadably received through an arm 12 having a clamping surface 21 which preferably only makes line contact with the periphery of line L. Screw 20 may be provided with a finger manipulative portion 22 for facility in setting screw 20.

A transducer supporting member in the form of a carrier bolt 23 extends between arms 13. As shown, one arm 13 is threaded to receive the end of bolt 23 and the other arm 13 is relieved at 24 to countersink the head of bolt 23. Alternatively, the threaded end of bolt 23 could extend through arm 13 and receive a nut thereon. Supported about the shank portion of supporting member 23 is an insulating sleeve 25. Disposed about sleeve 25 is a piezoelectric wafer or disc 26 of the type adapted to emit an electrical signal when subjected to a change in pressure.

In surface contact with crystal 26 on either side thereof are contact plates or electrodes 27 and 28. Electrode 27 is grounded to mounting member 11 and electrode 28 has connected thereto a lead 29 extending through an insulator 30 within connector 31 which is threadably received in the lower portion of one of arms 13, and adapted to receive a suitable lead such as a coaxial cable.

Disposed on either side of crystal 26 between the arms 13 are elements 33 and 34 selected to be of a material having a high internal damping coefficient. The elements 33 and 34 are selected as spacers and also have the characteristic of high internal damping characteristics for reasons hereinafter discussed. A suitable material is an acetyl resin of the type marketed by E.I. DuPont DeNemours & Co. under the trademark Delrin-AF.

In operation, the housing member 11 is coupled and clamped to the line as shown at FIG. 2 with the axial center line of the line L perpendicular to the inner side walls of arms 12 and 13. The coupling means is firmly clamped to the line. Then, upon expansion of the line due to charge of fluid passing therethrough, an outward bending force will be exerted on seat 15 and screw 20 deflecting the arms 12 and 13 outwardly. Since the arms are very stiff in relation to bridging portion 14, this will produce an inward deflection of arms 13 acting against the surfaces of crystal 26 through the elements 33 and 34. This compressive force exerted on the crystal 26 will produce an electrical signal which varies as a function of the pressure exerted thereon due to expansion of the line through the well known piezoelectric characteristic. The signal is then picked off line 29 and may be utilized as hereinafter pointed out.

FIG. 3 illustrates an alternative arrangement of the mounting member of frame of FIG. 3 and like reference numerals as utilized in FIGS. 1 and 2 are utilized in FIG. 3 to identify the same elements. In the arrangement shown in FIG. 3, spring washers, commonly referred to as Bellville washers, 35, 36 and 37 are provided behind portion 18 of seat member 17 and between the inside surfaces of arms 13 and elements 33 and 34, respectively. The purpose of such spring washers is to provide an additional preloading on transducer 26 either through the seat member 17 or acting upon the elements 33 and 34. It is to be understood that in operation, if the preloading means 35 is used, the preloading washers 36 and 37 need not be used and vice versa. In FIG. 3, the arm 12, receiving member 15, may be formed with a slot 38 to allow assembly of member 15 and spring washer 35 thereto.

The transducing arrangement thus far described in the application shown is primarily intended for use in sensing the deflection of a line L having intermittent fluid charges pass therethrough. To this end, a piezoelectric crystal which produces an electrical output as a function of pressure change thereon is a suitable transducer. In such application, the pressure of the fluid in the line may be in the range of three to six thousand or more pounds per square inch. Such pressure is sufficient through expansion of the diameter of Tube L to produce an outward deflecting force on the upper arms 12 which results in bending moments in bridging portion 14, flexing thereof, and an inward deflecting force on the lower arms 13.

The frame member 11 is sized and dimensioned with respect to the pressure range which it will measure in that it will always operate within its stress-strain characteristic within the linear portion of such characteristic, and below its elastic limit. The stiffness of the arms in relation to bridging portion 14 is determined by relative dimensioning. For this purpose the mounting member of frame 11 may be made of cold rolled steel, and the seating insert 15 may be of brass.

It will be apparent that this construction provides an extremely rugged transducing element which is easily adjustable and which may be easily mounted to a line and removed therefrom. To protect the crystal, a generally U-shaped cover member 39 may be fastened over the front and back of the frame as shown in FIG. 1 to enclose the transducer.

In practice, a device as shown in FIG. 2 may have a height of only approximately three-quarters of an inch in height and five-eighths of an inch in width when acting upon a line of one-fourth inch outside diameter.

It is preferred that the dimension H2 between the center line of support bolt 23 and the center of bridging member 14 be at least equal to the dimension H1 between the center of bridging member 14 and the point of contact of the coupling means on the line exemplified by the center line of the seating member 15, so that mechanical amplification may be obtained if desired. This, of course, will depend on the desired application of the transducing element.

FIG. 4 exemplifies a mounting member or frame 40 having side arms 41 and 42 joined by an integral bridging member 43 which is of lesser dimension at the portions 44 and 45 joined to arms 41 and 42, respectively. This mounting member configuration may be desired where the loading on the upper arm portions will be of relatively smaller magnitude, where greater deflection may be encountered, or to localize the bending stresses in the mounting member at the area of the junctions of the bridging member 43 to the arms 41 and 42. Mounting member 40 otherwise is constructed as previously described.

FIG. 5 exemplifies another arrangement of the invention utilizing a mounting member or frame 50 in which only the lower portions of the legs 51, 52 and a bridging portion 53 are shown. Leg 51 carries an insulated bolt or stud 54 threadably received through the lower portion of leg 52 and having a lock nut 55 thereon to lock the stud 54 in a selected position. Carried by arm 51 is a piezoelectric transducer 56 of the sandwich type which comprises two piezoelectric elements 57 and 58. The transducer 56 is supported in a cantilever fashion about a stud 59 having thereon an insulating sleeve 60. A contact member 61 is also carried by stud 59 in contact with crystal 58. Crystal 57 is grounded through spacer 62 to the mounting member 50. With this arrangement, the crystal assembly is maintained in fixed position on stud 59 by a nut threaded thereabout.

This type of transducer is well known to those skilled in the art and will provide an electrical output which varies with its mechanical deflection. Such transducers are available from the Piezoelectric Division of Clevite Corp. under the trademark "Bimorph." In this connection the electrical output will vary as a function of the deflection of the crystal in relation to its effective length. The signal output will be taken off between the lead 63 from contact member 61 and ground.

Another transducing arrangement which comprises a mounting member 65 having arms 66 and 67 with a bridging member 68 therebetween is shown in FIG. 6. In this arrangement the sensing element is a linear variable differential transformer (LVDT) which comprises a coil portion 69 and a core 70 mounted to a rod 71 which is linearly movable along the axis of coil portion 69. For adjustment purposes the rod 70 may be threadably received in arm 67 and receive a lock nut 72 thereon. As will hereinafter be described in conjunction with the electrical circuits for the LVDT this arrangement is more particularly adapted to measure pressure in a line where the fluid flow is continuous. The LVDT or, more specifically, the discriminator therefor will provide an output signal which varies in magnitude as a function of the position of core 70 within coil portion 69. Leads for both excitation and output leads of the coil 69 are shown at 72a and the schematic arrangement of the LVDT is hereinafter set forth in FIG. 9.

FIG. 7 shows still another arrangement of the transducing element wherein a capacitive arrangement is utilized to sense deflection of the lower legs 73 and 74 of a mounting member 75 having a bridging portion 75a.

A capacitive transducer 76 comprises plates 77 and 78 separated by an elastomeric dielectric 79. Rigid spacing elements 80 and 81 similar to elements 33 and 34 are also provided. This arrangement may be held together by pressure, by bondings, or by support on a supporting member as shown in FIG. 2. Also, preloading members as shown in FIG. 3 may be utilized. As will hereinafter be described, this arrangement may be utilized for sensing a predetermined line pressure or for continuous pressure monitoring.

It will be apparent that various types of transducing or signal generating elements may be utilized to sense deflection of the lower legs of the mounting member or application of pressure therebetween. The selection of the signal generating element will depend upon the type of line and fluid pressure therein which is to be measured. For similar reasons, the size and dimensions of the H-shaped housing member will vary. For example, where large motion sensitivity is required the cantilever sandwich element, as shown in FIG. 5, may be utilized.

Where there will be substantial expansion of the diameter of the tubing at relatively low pressures, an H-shaped mounting member with a more flexible bridging portion, will be utilized. Again, as by way of example, where pressure in the line over a period of time (rather than intermittent charges) is to be monitored, the signal generator which will provide a continuous signal output such as the LVDT of FIG. 6 or the capacitance of FIG. 7 may be utilized. These last two-mentioned embodiments, of course, require external excitation.

The signal output from the signal generating element may be utilized for various purposes. For example, in the arrangement of FIGS. 1 and 2, a signal conditioning circuit as shown in FIG. 8 may be utilized. Where the arrangement of FIGS. 1 and 2 is utilized to sense the pressure time characteristic or measure the pressure due to a fuel charge in a diesel engine, the transducer of FIGS. 1 and 2 may be mounted to the injection line of a given cylinder. The output of transducer 26 is applied by a coaxial cable and connector 82 and to an amplifier 83 in the form of a FET source follower, via a voltage divider 84. The output of amplifier 83 is applied to a low pass filter 85 and amplifier 86. The filter 85 is selected to pass only the signal which varies as the function of the pressure time characteristic of the fuel charge. The elements 33 and 34 which have high internal dampening coefficients serve to attenuate higher frequency vibration on the line which may be produced by engine vibration. The output amplifier 86 may then be observed as by means of a scope or other waveform measuring device 87a connected to terminal 87. The output of amplifier 86 is also applied to a voltage level sensor 88 which will provide an output signal in response to an input signal above a reference threshold value as may be determined by the setting of a potentiometer 89. The output of the voltage level sensor is then applied to a pulse generator 89a which may be a one-shot multivibrator utilized to fire a strobe or timing light 90 which is directed to a piston top dead center (TDC) marking on the flywheel 91 of an engine 92 as exemplified in U.S. Pat. No. 3,511,088.

The output of the pulse generator 89a may also be applied to a tachometer 93 to derive an indication of engine speed.

A similar signal conditioning circuit may be utilized in conjunction with the cantilever sandwich type transducer of FIG. 5.

In one application of the invention it may be utilized to measure the angle between the time of fuel injection and the angle or time between the time of fuel injection and the TDC position of a piston in a cylinder. The transducer will produce an output signal which varies as a function of the pressure exerted thereon. This signal is then shaped as shown in FIG. 8 to provide a pulse which is utilized to fire a light which is directed to the TDC markings on the flywheel of the engine. From this, the angular relationship or timing between the fuel injection and the TDC position may be determined. Alternatively, instrumentation may be provided in which the TDC position is indicated by a signal from a magnetic sensor 93a which may be mounted on the flywheel and engine. A signal from the output of pulse generator 89a is applied to a comparison network 94 which may be in the form of a bistable multivibrator. The signal from the sensor 93a which is indicative of the TDC position of the piston is also applied thereto through a pulse shaper 95, such as a one-shot multivibrator. The successive signals will cause the states of conduction of the bistable multivibrator 94 to shift during the pulses t1 to t2 which will indicate the difference in time or angular position. In this case, the time t1 to t2, taken together with the time between successive t2's, is the measure of the angular displacement or time between fuel injection and TDC position of the engine.

In some instances, a transducer may be utilized with lines of the same outside diameter but different inside diameters. In such cases, calibration compensation will be required.

The various taps, 84a, 84b, 84c of voltage divider 84 may be selected in accordance with the thickness of the walls of the line L under observation. For example, a ¼ inch O.D. line may have inside diameters of 0.063, 0.078, 0.093 or 0.125 inch. The expansion of the line with pressure will be a function of the wall thickness and may be expressed as $$d_o = P \frac{d_o/2}{E} \left[ \frac{(d_i)^2}{\left(\frac{d_o}{2}\right)^2 - \left(\frac{d_i}{2}\right)^2} \cdot (2 - \mu) \right] \quad \text{I}$$

where
- $P$ is pressure in the line in lbs/in²
- $\mu$ is the Poisson's ratio for the material of the line
- $E$ is Young's modulus
- $d_o$ is the outside diameter of the line
- $d_i$ is the inside diameter of the line
- $d_o$ is the change in the outside diameter of the line due to pressure in the line A variation in wall thickness $$\left(\frac{d_o}{2} - \frac{d_i}{2}\right)$$

will give a change in $\Delta d_o$ for the same internal pressure when $E$ and $\mu$ remain constant letting $$(P/E)(2-\mu) = K$$

then I becomes:

$$d_o = K \frac{d_o}{2} \left[ \frac{(d_i)^2}{\left(\frac{d_o}{2}\right)^2 - \left(\frac{d_i}{2}\right)^2} \right]$$

for tubes have the same OD ($d_o$) but different ID ($d_i'$) II will be:

$$\Delta d_{o_1} = \frac{d_o}{2} \left[ \frac{(d_i')^2}{\left(\frac{d_o}{2}\right)^2 - \left(\frac{d_i'}{2}\right)^2} \right]$$

let $A = \Delta d_o / \Delta d_i$
attenuation factor then:

$$A = \frac{\frac{(d_i)^2}{\left(\frac{d_o}{2}\right)^2 - \left(\frac{d_i}{2}\right)^2}}{\frac{(d_i')^2}{\left(\frac{d_o}{2}\right)^2 - \left(\frac{d_i'}{2}\right)^2}} \quad \text{III}$$

Assuming one-quarter inch by 0.063 ID ($d_o$ and $d_i$) to be standard then an increase in the ID ($d_i$) will result in a decrease in $A$, increase in transducer output, for same pressure, and a resistor such as 84d, FIG. 8, whose value can be determined by III will be required to give the same output in volts/psi for various wall thickness.

In this manner the values of the resistors 84d, 84e, and 84f may be predetermined to correlate the signal input to amplifier 86 for lines of the same material having a different inside diameter and the same outside diameter, to provide the same output signal in volts/psi of pressure for tubes of various inside diameter. The signal input level will increase with decreasing wall thickness. The voltage divider may also be calibrated for other varying line characteristics.

FIG. 9 exemplifies schematically the operation of the arrangement of the signal generating transducer of FIG. 6. The coil exemplified in FIG. 6 comprises three coils 69a, 69b and 69c. The coils 69b and 69c are connected in voltage opposition. Coil 69a is excited from an AC source. Voltages are generated in the coils 69b and 69c of a magnitude dependent upon the position of movable core 70. The resultant voltage is applied to a discriminator 96 which will yield a DC voltage output proportional to displacement of the core 70 from a neutral position. This DC output may be compared with a reference value, applied to a meter calibrated in units of pressure or utilized in any desired network.

Where the transducing arrangement of FIG. 7 is to be utilized to detect a predetermined pressure in a given line, it may be used in conjunction with the circuit of FIG. 10 which is an oscillating bridge-detector generally operating in the audio frequency range. The circuit is arranged so that oscillation occurs when the differential capacitance between the transducer capacitor 76 and a reference capacitance 100 exceeds a predetermined value. It will be noted that the capacitor 76 and the reference capacitance 100 together with the center tapped winding 101 of transformer 102 form a bridge circuit. The bridge is excited through the winding 103 of transformer 102 from an amplifier 104. When the differential capacitance due to a change in the capacitance of transducer 76 reaches a predetermined value the bridge becomes unbalanced and oscillations occur providing feedback to amplifier 104. The oscillations are taken from the output terminal 105 of amplifier 104 and may be utilized to trigger a relay or other switching device such as a one-shot multivibrator. This signal may then be utilized as shown in FIG. 8.

FIG. 11 exemplifies a circuit where a direct current output voltage is provided as a linear function of transducer capacitance. In FIG. 11 transducer capacitor 76 as well as a reference capacitor 105a is excited by a low frequency alternating current or RF excitation from a generator 106. It will be seen that there will be a current flow through rectifier 107, resistor 108 and output resistor 109 during one-half of the AC cycle. During the other half of the AC cycle, there will be a current flow through resistor 109, resistor 110 and rectifier 111. By proper selection of the values of resistors 108 and 110 and the nominal capacitance of capacitor 76 this circuit may be balanced so that when no deflection is sensed by capacitor 76 the voltage across resistor 109 is zero. However, as the capacitance of capacitor 76 may vary there will be a change in the current flow through resistance 109 and, hence, a voltage drop thereacross which is proportional to the change in capacitance of capacitor 76. This arrangement may be utilized for continuously monitoring the pressure in a line, and also may be utilized where the pressure in the line varies with the passage of fluid charges therethrough.

It will be apparent that the disclosed transducer is usable for a wide range of applications on various types of tubes or lines. The H-shaped frame member is selected of materials and dimensions to give a maximum output for loading applied without being deflected past its elastic limits. The stiffness of the material is selected in accordance with the strength of the tubing to be measured. Additionally, the material of the H-shaped frame mounting member should be selected to have a coefficient of thermal expansion which is essentially the same as the thermal expansion of tubing in which pressure is to be monitored. As previously mentioned, the arms of the H-shaped member should be stiff in relation to the bridging portion, so that flexing of the material of the member occurs in the bridging portion.

The various uses to which a transducer arrangement in accordance with the invention is to be utilized will determine the selection of the type of transducing element. For example, where high pressure in the order of 3,000 psi and up are to be sensed, the transducing element would preferably be a piezoelectric crystal or ceramic wafer as shown in FIGS. 1–3. Similarly, where the frequency of the fluid pressure charges passing through a point in the line where measurements are to be made is high in the order of 3 kilocycles, 3,000 hz a wafer type piezoelectric element may be preferred. Where higher signal output per unit of deflection of the arms of the frame is desired it may be preferred to utilize the sandwich type piezoelectric transducer as shown in FIG. 5, where lower frequency pulsations in the order of 300 hz or lower may be experienced.

Where the pressure of a constant fluid flow in a line is to be monitored a continuous signal output may be derived either from the capacitance type transducer of FIG. 7 or the electromagnetic transducer of FIG. 6 taken in conjunction with the accompaNying circuitry as shown in FIGS. 9 and 10.

The quantity being tested or monitored in conjunction with the type of tubing will determine the relative dimensions of the transducer mounting member, the material thereof, and the type of transducing element which may be utilized.

Where the transducer is designed to accept tubing of a fixed outside diameter where the inside diameter will vary in known amounts, the transducer will be designed to accept the deflection of the largest ID tubing at the highest pressure. Compensation may then be electrically provided as, for example, by the voltage divider 84 of FIG. 8.

From the foregoing disclosure it may be seen that the objects of the invention are efficiently attained. While preferred embodiments of the invention have been set forth for purposes of disclosure, it is to be understood that other embodiments to the invention as well as modifications to the disclosed embodiment which do not depart from the spirit and scope of the invention may become apparent to those skilled in the art. Accordingly, the appended claims are intended to cover all embodiments and modifications of the invention which do not depart from the spirit and scope of the invention.

What is claimed is:

1. A transducing arrangement for measuring the pressure of fluid in a line comprising a housing member having first and second pairs of spaced apart arms and a bridging portion therebetween defining a unitary member, one of said pairs of arms defining a passage therebetween for receiving a line, coupling means carried by said one pair of arms for clamping said housing member to the line, a transducer, said transducer being supported between said other pair of arms, said transducer being effective to emit a signal indicative of deflection of said second pair of arms from a normal position upon expansion of a line in said coupling means in said first pair of arms.

2. The arrangement of claim 1 wherein said arms are relatively stiff in relation to said bridging member.

3. The arrangement of claim 1 wherein said coupling means comprises a line seating member carried on one of said one pair of arms having a seating surface complimentary to the engaged portion of the line.

4. The arrangement of claim 1 further including means for establishing a pre-load on said transducer when said mounting member is coupled to a line.

5. The arrangement of claim 1 wherein said transducer is a piezoelectric element.

6. The arrangement of claim 5 wherein said piezoelectric element is in the shape of a disc having contact plates on either side thereof, and spacing members having a high coefficient of internal dampening disposed between said plates and said second pair of arms.

7. The arrangement of claim 6 further including a supporting member extending between said second pair of arms and secured to one of the arms of said second pair, said supporting member extending through said piezoelectric element, said plates, and said spacing elements.

8. The arrangement of claim 1 wherein said transducer is positioned between spacing elements having a high coefficient of internal dampening between said second pair of arms.

9. The arrangement of claim 8 wherein said transducer and said spacers are bonded together and bonded to said second pair of arms.

10. The arrangement of claim 1 further including a generally U-shaped cover member attached to said mounting member and enclosing said transducer.

11. The arrangement of claim 1 wherein said coupling means includes a line contacting member carried by one of said one pair of arms, and preloading means positioned between said line contacting member and said one arm.

12. The arrangement of claim 8 further including resilient means disposed between said spacing elements and each of said second pair of arms.

13. The arrangement of claim 1 further including means disposed between said second pair of arms and said transducer for establishing a pressure preload on said transducer.

14. The arrangement of claim 1 wherein said transducer is a capacitance.

15. The arrangement of claim 1 wherein said transducer is a variable differential transformer having a coil portion carried on one of said second pair of arms and a core portion carried on the other of said second pair of arms.

16. The arrangement of claim 1 further including means for detecting a signal of predetermined magnitude emitted by said transducer.

17. The arrangement of claim 16 further including a lamp and means for coupling the signal of predetermined magnitude to said lamp.

18. For use in combination with a fuel injection line of an internal combustion engine adapted to have fuel charges under pressure pass therethrough, a mounting member having first and second pairs of spaced apart arms and a bridging portion therebetween defining a unitary member, one of said pairs of arms defining a passage therethrough for receiving the line, and coupling means carried by said one pair of arms for clamping said mounting members to the line, a transducer supported between said other pairs of arms, said transducer being effective to emit a signal which varies as a function of deflection of said second pair of arms from a normal position upon expansion of the line in said coupling means in said first pair of arms.

19. A transducing arrangement for measuring the pressure of fluid in a line comprising a mounting member having first and second pairs of spaced apart arms and a bridging portion therebetween defining a unitary member, one of said pairs of arms defining a passage therebetween for receiving a line, coupling means carried by said one pair of arms for clamping said housing to the line, a transducer supporting member extending between said other pair of arms and supporting a transducer thereon, said transducer being effective to emit a signal indicative of deflection of said second pair of arms upon expansion of a line in said coupling means in said first pair of arms.

20. A system for measuring pressure of fluid in a tubular line, comprising a housing member, means for clamping said housing member to the line, a transducer carried by said housing member and being effective to emit an electrical signal which varies as a function of pressure in the line, said transducer being carried by said housing member so as to be subjected to mechanical movement by expansion of the line, amplifying means for amplifying the signal emitted by said transducer, and means for controlling the magnitude of the signal input to said amplifying means as a function of a characteristic of the tubular line.

21. The system of claim 20 wherein the characteristic of the tubular line is wall thickness and said means for controlling comprises a voltage divider calibrated in accordance with varying wall thickness of the line.

22. The system of claim 21 wherein said housing member is arranged to receive a tubular line of predetermined outside dimension, and said voltage divider is calibrated in accordance with a plurality of possible inside dimensions.

23. The system of claim 20 further including means for indicating the signal output of said amplifier.

24. The system of claim 20 further including means for detecting a predetermined value of the output signal of said amplifying means.

25. Apparatus for measuring the pressure in a tubular line due to expansion thereof comprising a pair of spaced clamping arms, means joining said clamping arms intermediate the ends thereof for allowing movement of said arms toward and away from one another, readily releasable clamping means on said arms on one side of said joining means and including line engaging portions for clamping a line between said arms, said joining means being connected to both of said arms and constructed and arranged to flex upon expansion of a line in said clamping means, said readily releasable clamping means enabling said line pressure measuring apparatus to be readily moved and positioned along said pipe, measuring means including mechanical movement to electrical signal transducing means connected between said arms on the other side of said joining means and responsive to movement of said arms, and indicating means for indicating the pressure within said line connected with said transducing means.

26. Apparatus as defined in claim 23 wherein said clamping arms extend substantially parallel with one another.

27. Apparatus as defined in claim 23 including adjusting means for adjusting a portion of the clamping means to adjust the amount of pressure applied.

28. Apparatus as defined in claim 23 wherein said means joining said arms comprises a connecting portion of reduced area compared with said clamping arms, said connecting portion being subjected to bending moments when said arms move away from one another.

29. Apparatus as defined in claim 25 wherein the distance of said transducer from said joining means is greater than the distance of said line engaging portions from said joining means.

30. Apparatus as defined in claim 25 wherein said clamping arms and said means joining said arms comprise a substantially H-shaped one-piece construction.

31. Apparatus as defined in claim 28 wherein said means joining said arms has a notch formed therein.

32. Apparatus as defined in claim 23 including removable inserts mounted in said arms for engaging an associated line.

33. Apparatus as defined in claim 32 wherein one of said inserts has curved surfaces adapted to fit against the outer surfaces of an associated line.

34. Apparatus for measuring fluid pressure in a tubular line comprising a unitary member having first and second pairs of arms extending in opposite directions from a bridging member therebetween, coupling means on one pair of said arms arranged to clamp said member to a line extending between said first pair of arms, a mechanical movement to electrical signal transducer carried between said other pair of arms, said bridging member being of lesser cross-sectional area than the cross-sectional area of said arms.

35. The apparatus of claim 34 wherein the distance from said bridging member to said coupling means is less than the distance of said transducer to said coupling means.

36. Apparatus for measuring the pressure in a tubular line, comprising a pair of spaced apart arms, a bridging member having opposite ends joined to and spacing said arms intermediate the ends of said arms, releasable clamping means carried on said arms on one side of said bridging member for clamping a line between said arms, said bridging member being constructed and arranged to flex upon expansion of a line in said clamping means, transducing means connected between said arms on the other side of said bridging means and responsive to deflection of said arms upon flexing of said bridging member to produce a signal which varies as a function of the expansion of a line in said coupling means.

37. The apparatus of claim 36 wherein the cross-sectional area of said bridging means is less than the cross-sectional area of said arms.

38. The apparatus of claim 36 wherein the distance of said transducing means to said bridging member is greater than the distance of said bridging member to said clamping means.

39. Apparatus for measuring the pressure in a tubular line by detecting expansion of the line comprising a pair of spaced apart arms, a bridging member having opposite ends joined to and spacing said arms intermediate the ends of said arms, said arms on one side of said bridging member defining a passage therebetween for receiving a line therethrough, coupling means on said arms on said one side of said bridging member for releasably clamping said member to a line, said bridging member being constructed and arranged to flex upon expansion of a line clamped in said passage, transducing means connected between said arms on the other side of said bridging member and responsive to deflection of said arms upon flexing of said bridging member to produce a signal which varies as a function of expansion of a line in said coupling means.

* * * * *

PO-1050
(5/69)

UNITED STATES PATENT OFFICE
CERTIFICATE OF CORRECTION

Patent No. 3,698,249      Dated October 17, 1972

Inventor(s)     Preston R. Weaver

It is certified that error appears in the above-identified patent and that said Letters Patent are hereby corrected as shown below:

Column 12, line 14, change "pipe" to --line--

Signed and sealed this 20th day of November 1973.

(SEAL)
Attest:

EDWARD M. FLETCHER, JR.         RENE D. TEGTMEYER
Attesting Officer             Acting Commissioner of Patents